Oct. 8, 1940.   B. S. GILLMOR   2,217,109
WEED ROOT PULLER
Filed Oct. 10, 1939
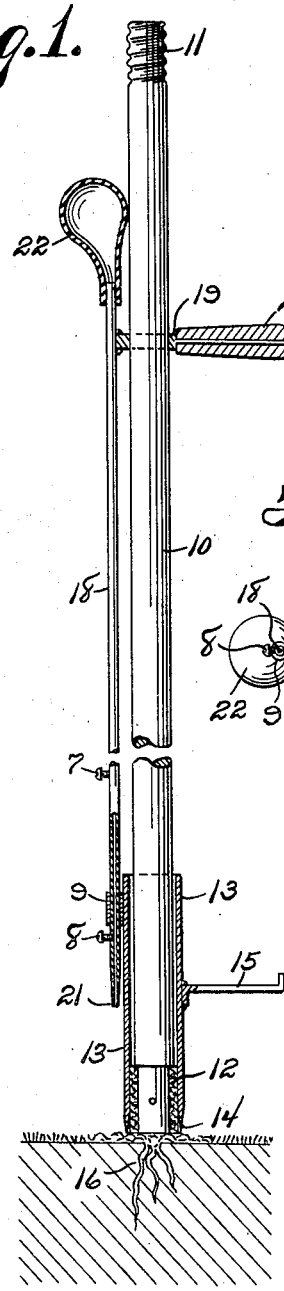
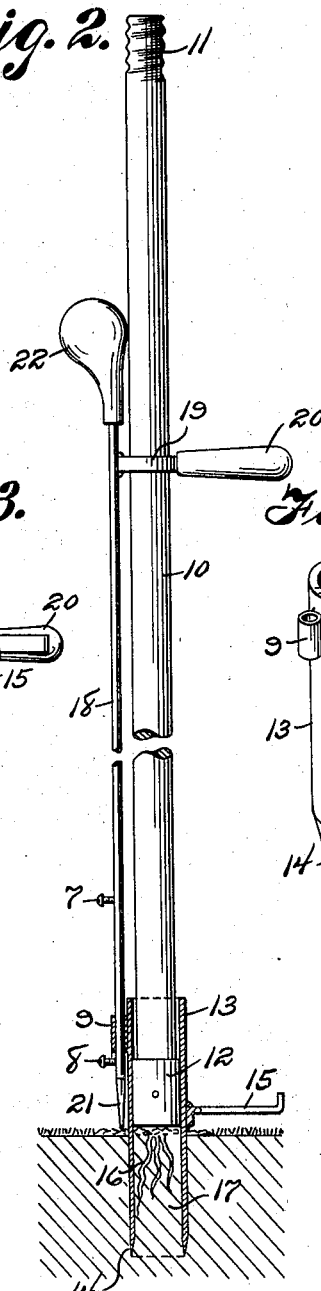
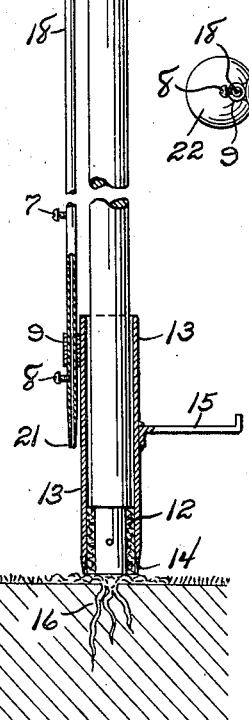
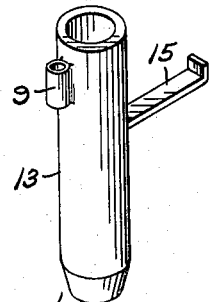
Bowen S. Gillmor INVENTOR
BY Victor J. Evans & Co.
ATTORNEYS
WITNESS Patented Oct. 8, 1940

2,217,109

UNITED STATES PATENT OFFICE 2,217,109

WEED ROOT PULLER

Bowen S. Gillmor, Port Angeles, Wash.

Application October 10, 1939, Serial No. 298,859

3 Claims. (Cl. 47—49)

This invention relates to weed root pullers and has for an object to provide a device of this character having a cylinder and a plunger therein, the cylinder being adapted to be driven into the ground by the operator's foot to confine earth with the roots therein below the plunger, withdrawal of the plunger as the cylinder is raised from the earth creating a vacuum in the cylinder above the earth to co-act with the frictional engagement of the inner surface of the cylinder with the earth to more easily extract the root and earth than is possible with conventional root pullers.

A further object is to provide a device of this character having a laterally disposed oil tube and bulb therefor slidably mounted on the plunger rod through the medium of a ring equipped with a handle for manipulating the oil tube for the purpose of dropping oil in the bottom of the hole left by the extracted earth and root to positively destroy any root branches remaining in the hole.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a longitudinal sectional view of a weed root puller constructed in accordance with the invention.

Figure 2 is a longitudinal sectional view of the weed root puller shown in applied position to extract earth with the weed root therein.

Figure 3 is a bottom plan view of the weed root puller.

Figure 4 is a detailed perspective view of the cylinder.

Referring now to the drawing in which like characters of reference designate similar parts in the various views, 10 designates a plunger rod which may be easily removed from the root puller for other purposes and which may be formed of wood or other suitable material. The rod is fitted at the upper end with a screw thread 11 for connecting the rod to any suitable extension or tool. The rod is of substantially uniform diameter and at the lower end is equipped with a cylindrical packing 12 which forms a tight fitting plunger in a metal cylinder 13.

The cylinder 13 is of considerably greater length than the plunger and is sharpened at the lower end, as shown at 14, to easily penetrate the earth. The cylinder is equipped on one side with a laterally extending foot rest 15 upon which the operator's foot may be placed to force the cylinder into the ground to confine a plant root 16, and earth 17, in the cylinder below the plunger, as best shown in Figure 2.

An oil pipe or tube 18 is disposed longitudinally of the plunger rod 10 and is slidably mounted on the latter through the medium of a ring 19 which is disposed at the upper end of the oil tube and slidably fits on the plunger rod 10. A handle 20 is formed integral with the ring diametrically opposite the oil tube. The lower end of the oil tube is tapered to a reduced end to form a nozzle 21. The oil tube functions as a connecting rod between the cylinder 13 and handle 20. A rubber bulb 22 is disposed on the upper end of the tube for ejecting oil from the tube. The bulb may be removed to fill the tube with oil.

The tube is mounted for limited sliding movement on the cylinder 13 by a sleeve 9 which is fixed to the cylinder near the top thereof. A pair of spaced stop screws 7 and 8 are engaged in the side of the tube on opposite sides of the sleeve 9 to limit sliding movement of the tube to about three inches.

In operation the sharpened lower end of the cylinder is placed on the earth to surround the plant root. Then the operator places his foot upon the foot rest 15 and drives the cylinder into the earth for about one-half its length, that is, about four inches. The plant root 16 and earth 17 may now be withdrawn as a unit by simply drawing the cylinder upward by a pull on the handle 20, the lower stop screw 8 engaging the sleeve 9 to lift the cylinder from the ground. Whatever slipping occurs between them the piston 12 and cylinder wall during this operation, creates a vacuum in the cylinder below the piston in strong ground or loose sandy soil to co-act with the frictional engagement of the earth with the inner surface of the tube to more easily extract the root and earth than is possible with conventional root pullers.

In order to destroy any root branches which may be left in the hole, the lower end of the cylinder is placed on the ground near the hole. The tube is then slid down into the hole by pressure on the handle 20 until the upper stop screw 7 engages the top of the sleeve 9. Then the bulb is pressed to squirt the oil into the hole.

To remove an extracted root and earth from the device the handle 20 may be held in one hand to hold the cylinder 13 stationary with the stop screw 8 engaged against the sleeve 9 and then the plunger rod 10 may be pushed downwardly with the other hand to expel the extracted root and earth from the stationary cylinder.

The cylinder may be used to refill the hole by simply driving the cylinder 13 into the sod along the margin of a path or the like and removing a cylinder of sod in the same manner as was previously described in describing the operation of removing the earth and root. The cylinder 13 may now be inserted in the hole left by extraction of the root and earth. The cylinder is then raised by lifting upon the handle 20, at the same time maintaining the plunger rod at its lowest limit of movement, so that the plunger presses the sod cylinder into the hole.

From the above description it is thought that the construction and operation of the invention will be fully understood without further explanation.

What is claimed is:

1. A weed root puller comprising a metal cylinder having a sharpened lower edge to penetrate the ground, a foot rest on the cylinder for forcing the cylinder into the ground, a plunger rod, a piston on the rod fitting in the cylinder, a sleeve on the cylinder, an oil pipe mounted in the sleeve for limiting sliding movement, a guide ring carried by the pipe slidably receiving the plunger rod, and a handle on the ring, said pipe forming a connecting rod between the cylinder and the handle for pulling the cylinder out of the ground when the handle is raised.

2. A weed root puller comprising a metal cylinder, a plunger therein, a foot rest projecting laterally from one side of the cylinder, a sleeve on the cylinder, an oil tube slidably mounted in the sleeve, stop projections carried by the tube on opposite sides of the sleeve for limiting sliding movement in the sleeve, a ring connected to the tube and slidably mounted on the plunger, and a handle projecting from the ring, said tube forming a connecting rod between the cylinder and the handle whereby the handle can be raised to dispose one of said stop projections against said sleeve for pulling the cylinder out of the ground.

3. A weed root puller comprising a cylinder having a sharpened lower end, a foot rest extending from the cylinder intermediate the ends of the cylinder, a rod slidably associated with the cylinder, a piston on the lower end of the rod having a tight fit in the cylinder, the cylinder and rod being adapted to be used to remove a weed root and later to fill the hole left by the removal of the weed root with sod or fresh earth, a tube extending longitudinally of the rod connected to the cylinder for limited sliding movement, the lower end of said tube terminating in a nozzle, a guide ring carried by the tube slidably mounted on the rod, and a handle secured to the ring.

BOWEN S. GILLMOR.